United States Patent [19]
Rykowski et al.

[11] Patent Number: 5,790,725
[45] Date of Patent: Aug. 4, 1998

[54] MULTIPORT ILLUMINATOR FOR MACRO-FIBERS

[75] Inventors: Ronald F. Rykowski, Woodinville, Wash.; Andrew P. Riser, Capistrano Beach, Calif.; Stephen S. Wilson, San Juan Capistrano, Calif.; John F. Forkner, Laguna Beach, Calif.

[73] Assignee: Remote Source Lighting Int'l, Inc., San Juan Capistrano, Calif.

[21] Appl. No.: 743,426

[22] Filed: Nov. 1, 1996

Related U.S. Application Data

[63] Continuation-in-part of Ser. No. 459,613, Jun. 2, 1995, Pat. No. 5,706,376.

[51] Int. Cl.⁶ ............................................. G02B 6/32
[52] U.S. Cl. .................................. 385/33; 385/901
[58] Field of Search ............................ 385/33, 34, 35, 385/901; 362/22

[56] References Cited

U.S. PATENT DOCUMENTS

| | | | |
|---|---|---|---|
| 4,050,784 | 9/1977 | Kobayashi | 385/34 X |
| 4,389,698 | 6/1983 | Cibie | 362/32 |
| 4,811,171 | 3/1989 | Viola | 362/32 |
| 4,811,172 | 3/1989 | Davenport et al. | 362/61 |
| 4,816,975 | 3/1989 | Bahnemann et al. | 362/308 |
| 4,851,969 | 7/1989 | Davenport et al. | 362/61 X |
| 4,868,718 | 9/1989 | Davenport et al. | 362/32 |
| 4,912,605 | 3/1990 | Whitehead | 362/32 |
| 4,949,227 | 8/1990 | Finch et al. | 362/61 |
| 4,958,263 | 9/1990 | Davenport et al. | 362/32 |
| 4,961,622 | 10/1990 | Gorman et al. | 385/33 X |
| 5,222,793 | 6/1993 | Davenport et al. | 385/32 |
| 5,259,056 | 11/1993 | Davenport et al. | 385/115 |
| 5,367,590 | 11/1994 | Davenport et al. | 385/901 X |
| 5,377,287 | 12/1994 | Lee et al. | 385/31 |
| 5,396,571 | 3/1995 | Saadatmanesh et al. | 385/33 |
| 5,559,911 | 9/1996 | Forner et al. | 385/33 |

FOREIGN PATENT DOCUMENTS

| | | | |
|---|---|---|---|
| 2651283 | 5/1978 | Germany | 362/32 X |
| 63-291012 | 11/1988 | Japan | 385/33 |
| 6-174963 | 6/1994 | Japan | 385/24 |
| 2098311 | 11/1982 | United Kingdom | 385/901 X |

Primary Examiner—John Ngo
Attorney, Agent, or Firm—Donald E. Stout

[57] ABSTRACT

The inventive system, which is used in transmitting illumination from a central source to a variety of remote locations, efficiently couples the light originating from an arc lamp, or similar source, into a multiplicity of flexible macroscopic fibers. The combination of the several elements of the inventive system results in a very efficient transfer of the energy from the light source to the fibers. The system also provides a very flexible mechanical means for distributing the energy to the fibers and to the remote locations at which the light is used.

30 Claims, 20 Drawing Sheets

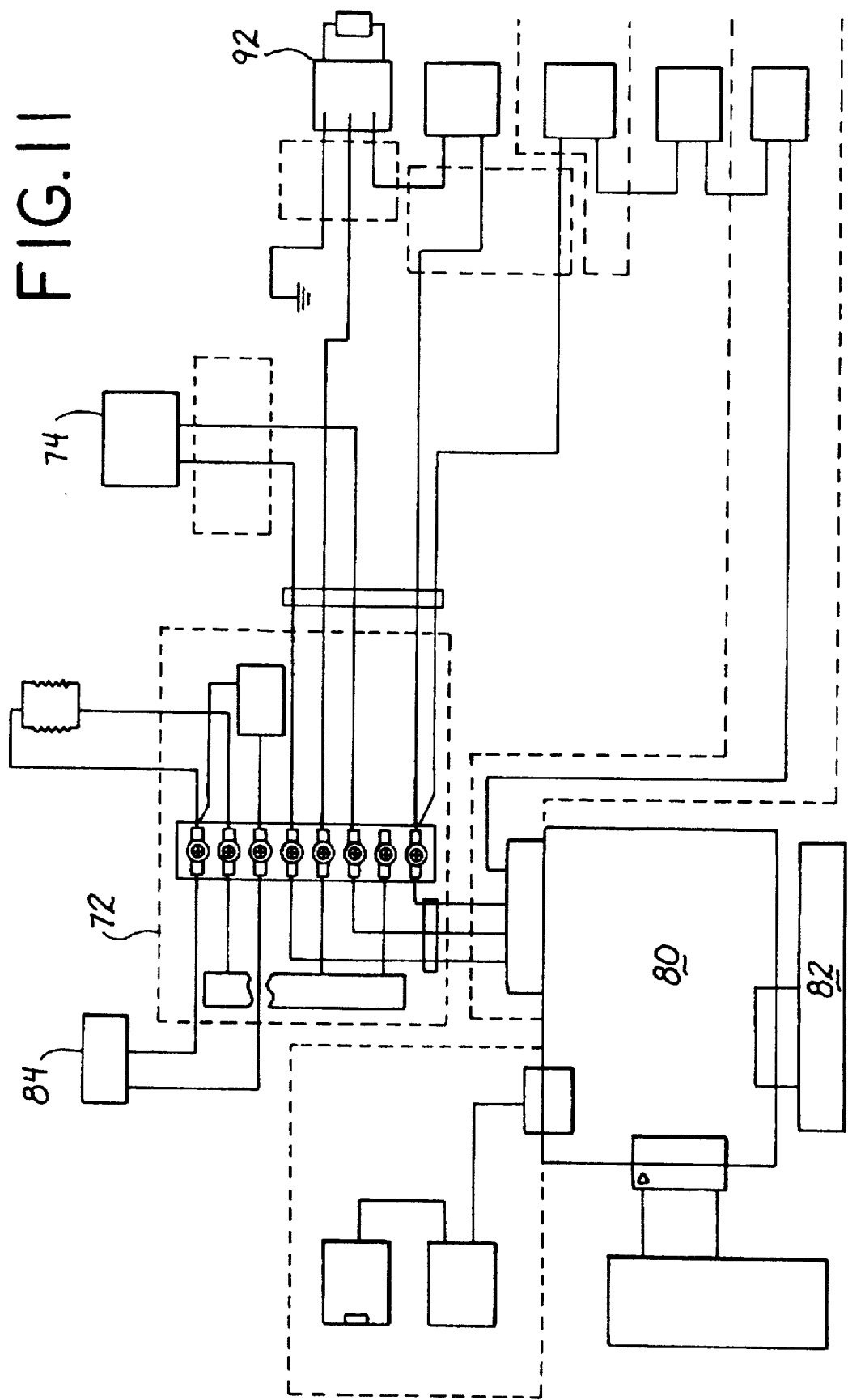

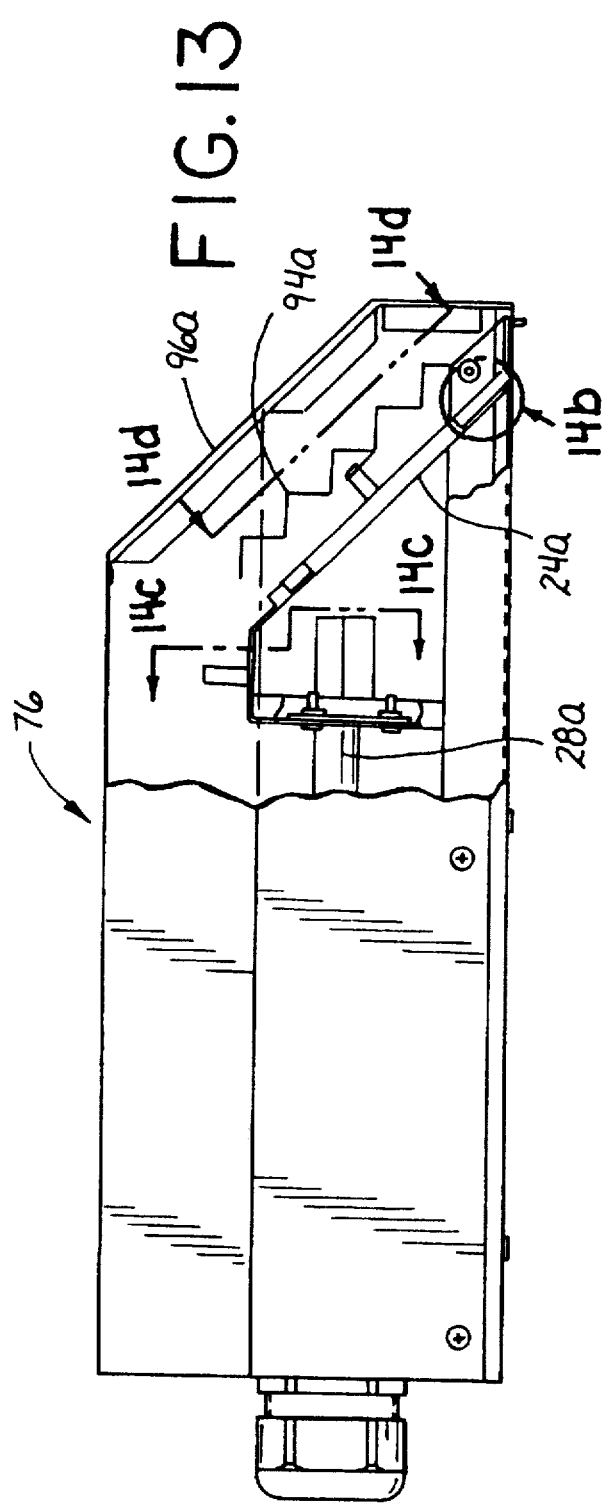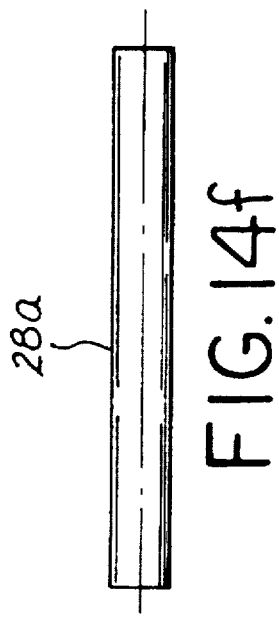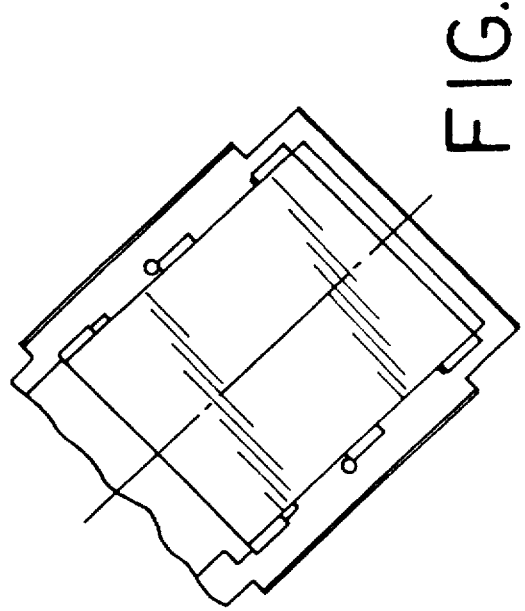

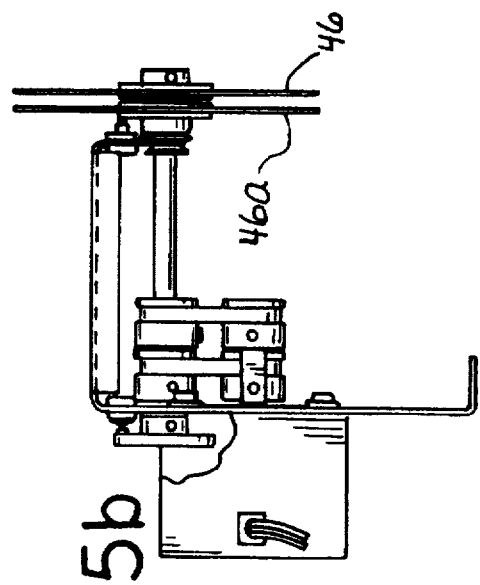
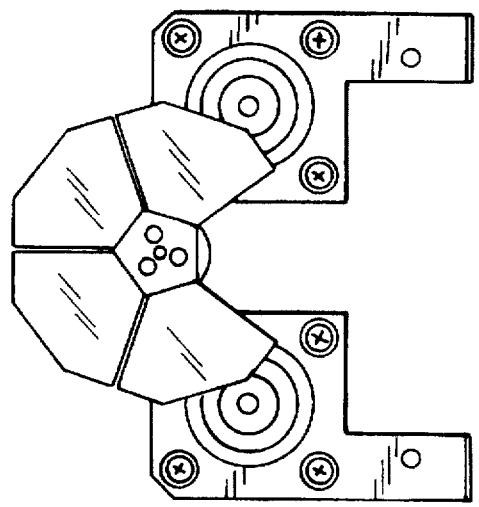
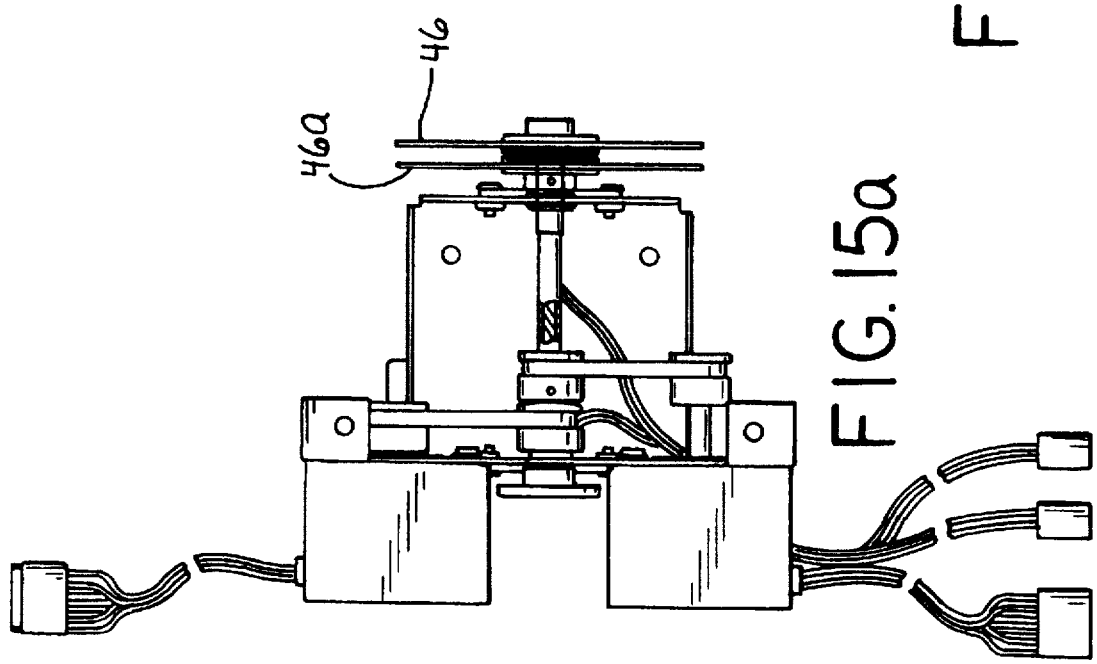
FIG.15b
FIG.15c
FIG.15a

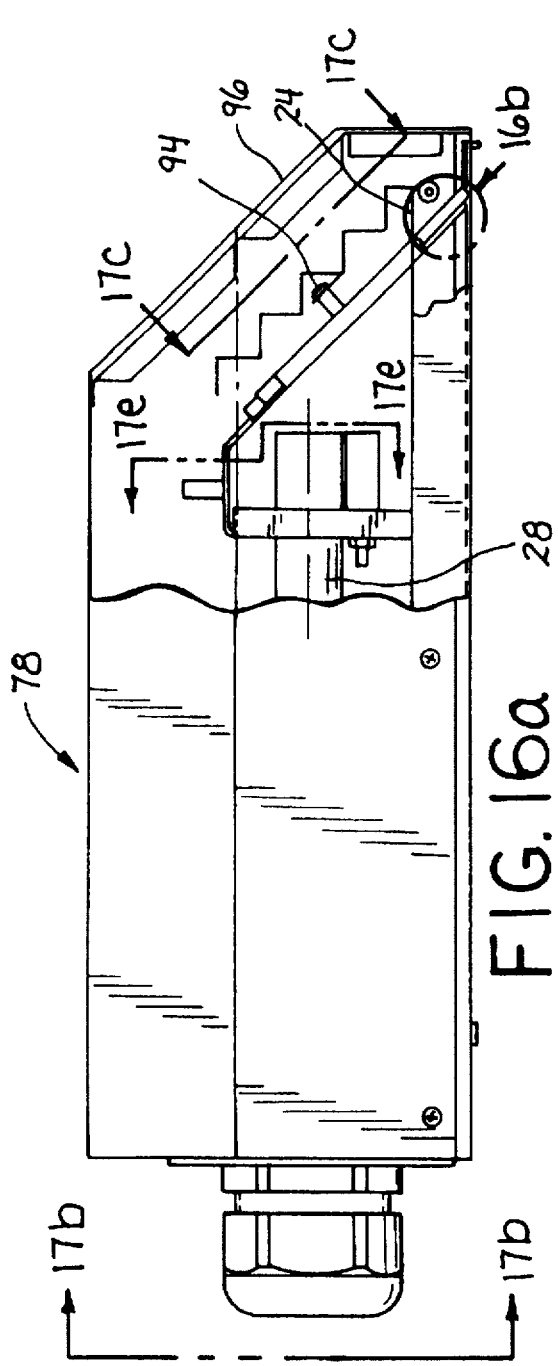
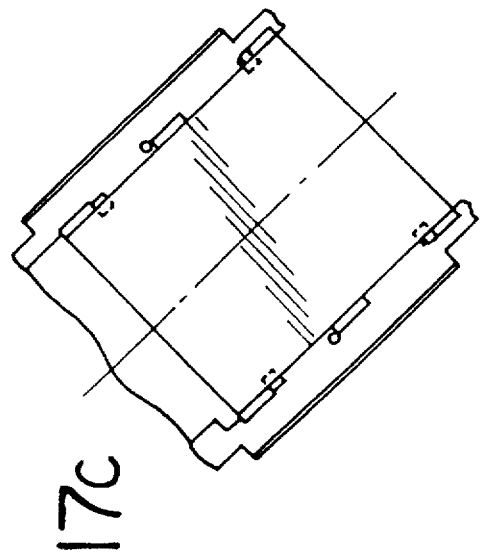
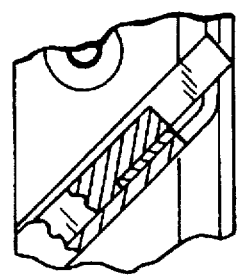

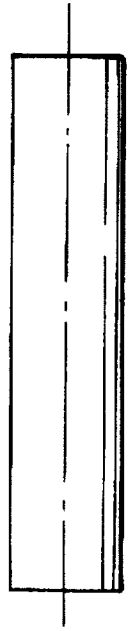
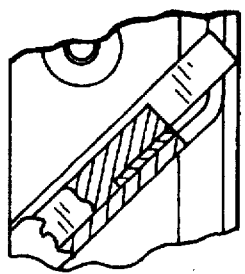
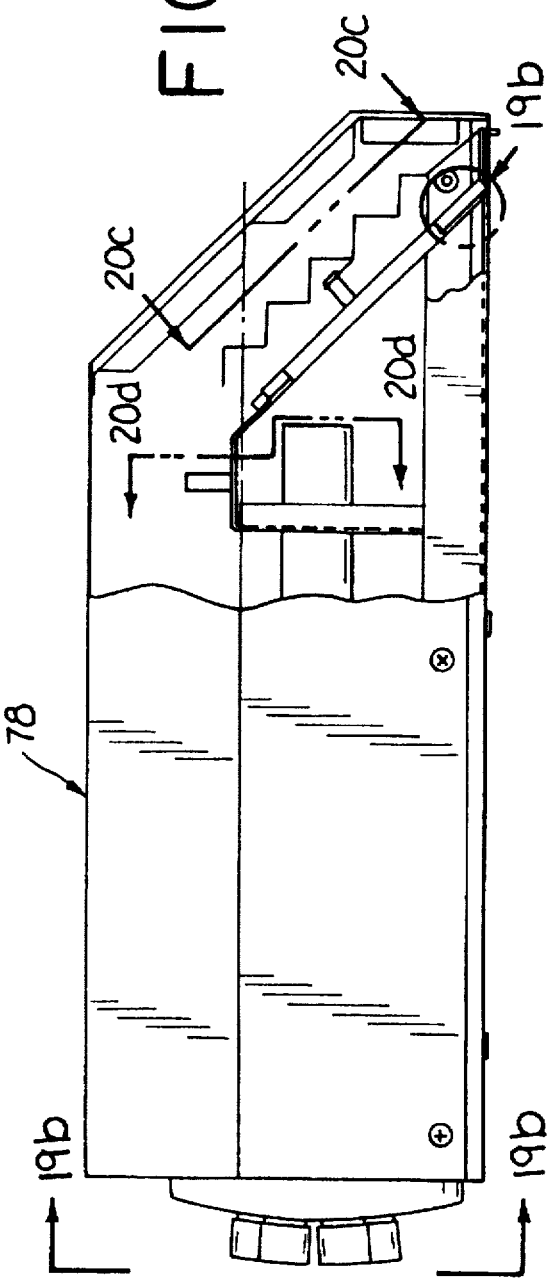

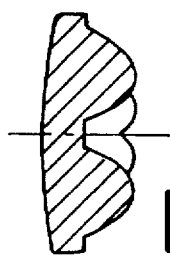
FIG. 23d
FIG. 23e
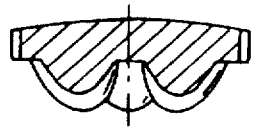
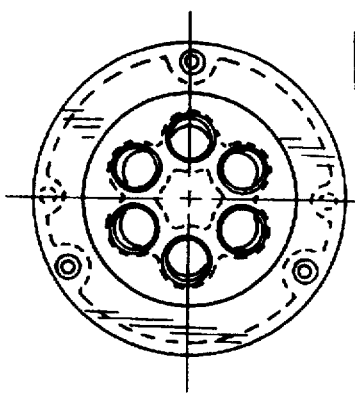
FIG. 24a
FIG. 24b
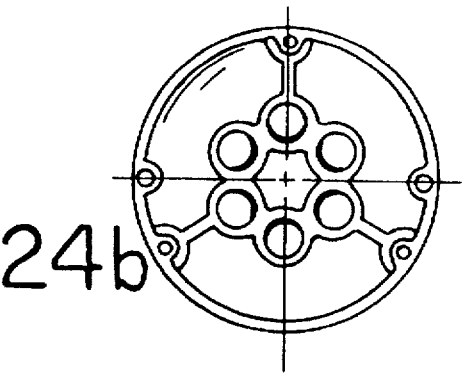
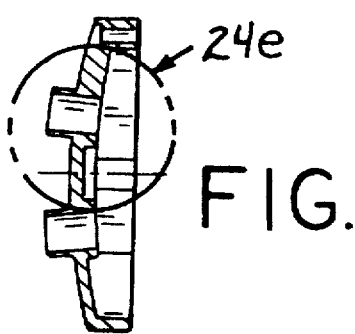
FIG. 24d
FIG. 24c
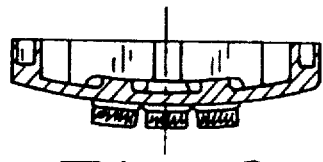
FIG. 24e
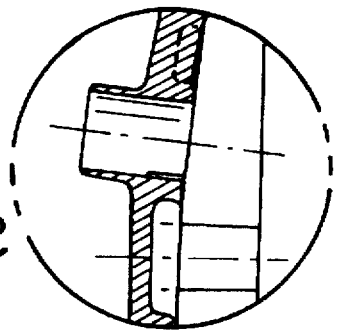

MULTIPORT ILLUMINATOR FOR MACRO-FIBERS

This application is a continuation-in-part of application Ser. No. 08/459,613, filed on Jun. 2, 1995, now U.S. Pat. No. 5,706,376 and entitled Multiport Illuminator for Macro-Fibers, which is commonly assigned and is herein expressly incorporated by reference. This application is related to application Ser. No. 08/374,163, filed on Jan. 17, 1995, U.S. Pat. No. 5,559,911, and entitled Optical Coupler, which is commonly assigned, and is herein expressly incorporated by reference. The application is also related to application Ser. No. 08/271,368, filed on Jul. 6, 1994 and U.S. Pat. No. 5,467,207 entitled LCD Projection System, which is also expressly incorporated herein by reference.

BACKGROUND OF THE INVENTION

Large diameter fiber optics, often referred to as "flexible light pipes," are well known in the art, and typically comprise a single, solid core fiber which is surrounded by a cladding layer and a sheath or shielding layer. The core is the portion of a light pipe which transmits light, and typically has a diameter of about 2 to 12 mm. It is formed of a very soft, semi-liquid plastic material, such as OPTIFLEX®, which is manufactured by Rohm & Haas Corporation, of Philadelphia, Pennsylvania. The cladding layer typically comprises polytetrafluoroethylene (PTFE or TEFLON®), or the like, while the outer sheath is fabricated of a material such as polyvinylchloride (PVC). Unlike small diameter optical fibers, which are typically used to transmit information in relatively complex control systems, these large diameter "light pipes" are typically employed in a variety of illumination systems where direct lighting is difficult to maintain, dangerous, or subject to vandalism. Examples include architectural lighting, display cases, pools and spas (to eliminate electrical connections near water), hazardous material zones (to eliminate the need for sealed lighting), or jail cells. They are particularly advantageous in that only a single centralized illumination system must be maintained, rather than a plurality of individual lights.

There are problems, however, in implementing state of the art light pipe illumination systems because of the difficulty of illuminating a plurality of light pipes from a single illumination source, as is discussed in related application Ser. No. 08/374,163. In order to maximize efficiency, the optical fibers must be bundled as closely as possible, to ensure the maximum ratio of core area (the part of each light pipe which actually transmits light) to total area. However, bundling the large diameter light pipes together in order to illuminate them from the single illumination source is difficult to do efficiently. Each of the individual light pipes are round and thus have a great deal of space between them due to the cladding and shielding layers. To obtain maximum efficiency, it is desirable to illuminate only the core of each of the bundled optical fibers, but this is impossible using state of the art bundling techniques. Necessarily, if the light from the source of illumination is spread across the array of optical fibers, it will illuminate not only the cores of the optical fibers, but also the cladding layers and the shielding layers. Furthermore, the voids between the optical fibers, which are inevitable because of the fibers' round dimensions, also are impacted by the light from the illumination source. All of the light falling upon any element other than the cores is wasted, and becomes an efficiency loss, since it will not be transmitted by the fibers. Additionally, packing the fibers so closely together creates problems such as mechanical difficulties in configuring and accommodating the illumination system and difficulties encountered in attempting to replace one of the individual bundled fibers. This design also typically results in color variation between fibers unless techniques are specifically employed to prevent this problem.

One prior art solution to this problem has been to eliminate the sheathing and cladding layers about each optical fiber, in order to reduce the area across the bundled array of fibers which does not transmit light. However, there is still a packing factor problem because the optical fibers are round, and there are other physical disadvantages in eliminating those layers. Thus, this solution is unsatisfactory for most applications.

SUMMARY OF THE INVENTION

This invention efficiently couples the light originating from an arc lamp, or similar source, into a multiplicity of flexible macroscopic fibers. Such a system is to be used in transmitting illumination from a central source to a variety of remote locations. The combination of the several elements of the inventive system results in a very efficient transfer of the energy of the light source to the fibers. The system also provides a very flexible mechanical means for distributing the energy to the fibers and to the remote locations at which the light is used.

The invention, together with additional features and advantages thereof may best be understood by reference to the following description taken in conjunction with the accompanying illustrative drawings.

BRIEF DESCRIPTION OF THE DRAWINGS

FIG. 11 is a schematic electrical diagram of the center source module, according to the presently preferred embodiment;

FIG. 13 is a partial cross-sectional view of a side module, according to the presently preferred embodiment;

FIGS. 14a–14f illustrate other views of a side module and interior portions of the side module, according to the presently preferred embodiment;

3

Figure 21A:
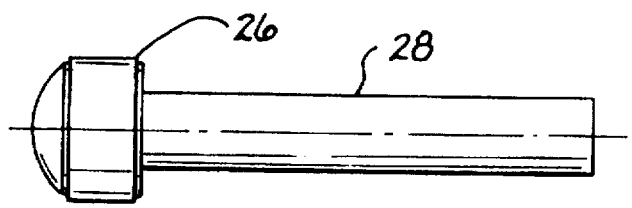
Figure 21B:
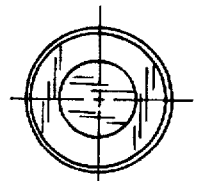
Figure 22A:
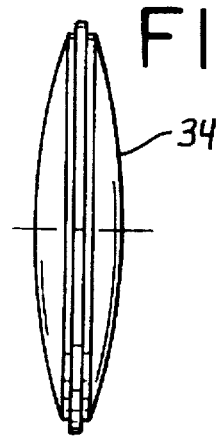
Figure 22B:
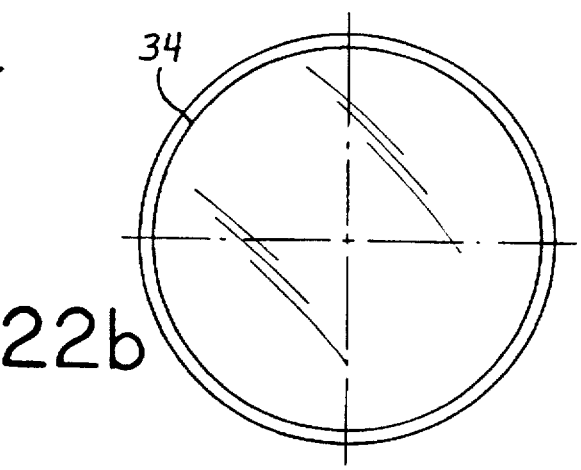

FIGS. 15a–15i are various views of the color wheel assembly, according to the presently preferred embodiment;

FIGS. 16a and 16b illustrate two views of a first side module configuration, according to one presently preferred embodiment;

FIGS. 17a–17e illustrate various views of the side module of FIGS. 16a and 16b, according to the presently preferred embodiment;

FIGS. 18a and 18b illustrate a light pipe for use in the side module of FIGS. 16a and 16b, according to one presently preferred embodiment;

FIGS. 19a and 19b illustrate a second side module configuration, according to one presently preferred embodiment;

FIGS. 20a–20d are various views of the side module of FIGS. 19a and 19b, according to one presently preferred embodiment;

FIGS. 21a and 21b illustrate a light pipe for use with the side module of FIGS. 19a and 19b, according to one presently preferred embodiment;

FIGS. 22a and 22b illustrate a focussing lens for use with the side module of FIGS. 19a and 19b, according to one presently preferred embodiment;

FIGS. 23a–23e illustrate various views of a multi-sector lens for use with the side module of FIGS. 19a and 19b, according to one presently preferred embodiment;

FIGS. 24a–24e are various views of a ferrule housing assembly for use with the side module of FIGS. 19a and 19b, according to one presently preferred embodiment;

FIGS. 25a–25d are various views of a first ferrule for use with the ferrule housing assembly of FIGS. 24a–24e, according to one presently preferred embodiment; and FIGS. 26a–26d are various views of a second ferrule for use with the ferrule housing assembly of FIGS. 24a–24e, according to one presently preferred embodiment.

DESCRIPTION OF THE PREFERRED EMBODIMENT

Referring now more particularly to the drawings, an optical system 10 is illustrated which includes a compact light source 12, which may comprise an arc lamp or similar source. The light source 12 is placed at the focus of a dual curved reflector 14, which comprises two reflector portions 16 and 18 which are disposed in a back-to-back fashion. In each reflector portion 16, 18, the center or vertex region of the reflector has been removed, as illustrated, and the two reflector portions are joined at intersection points 20 and 22.

Figure 1:
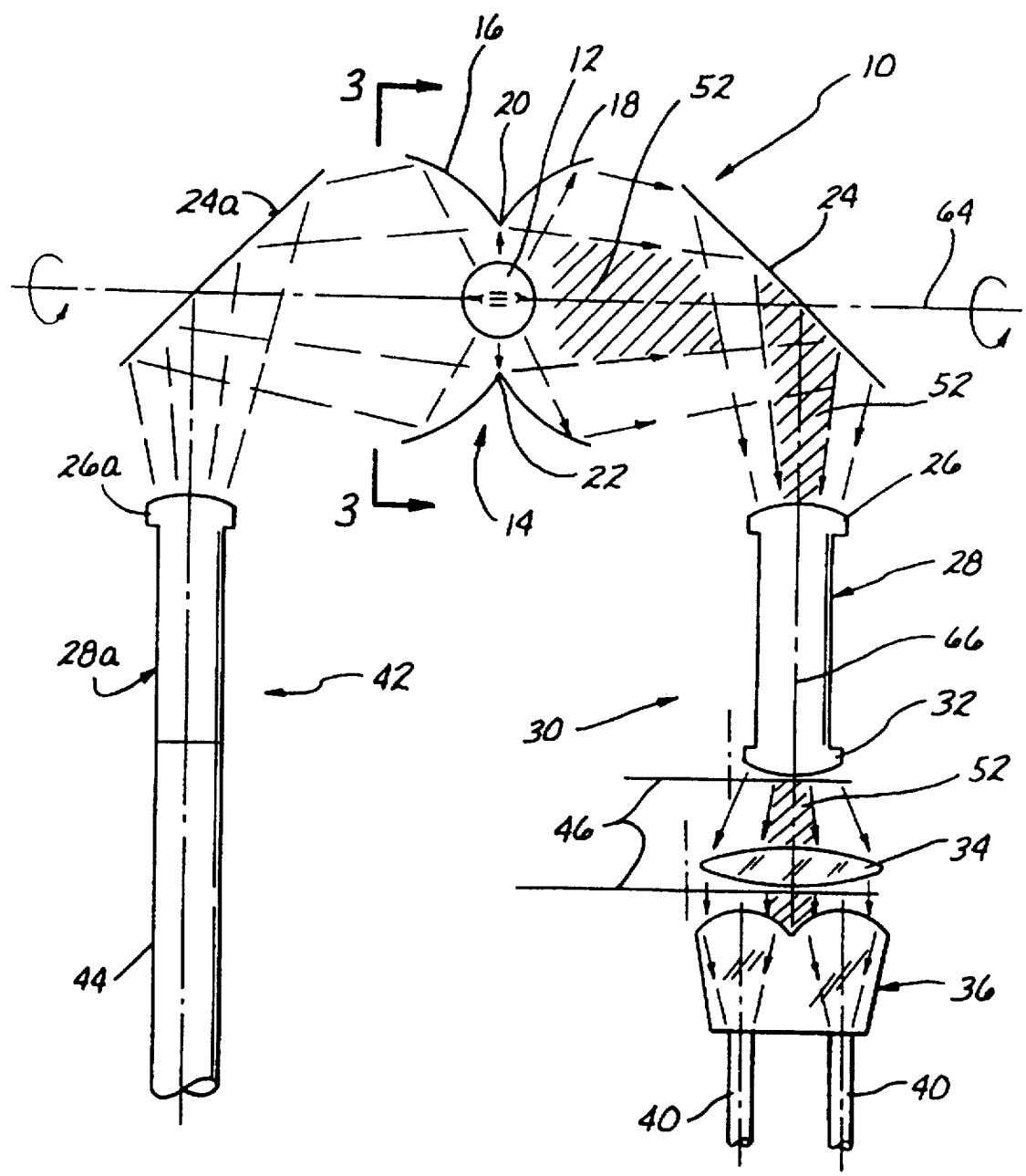
FIG. 1 is a schematic view of a preferred embodiment of the inventive optical system.

Light emitted from the light source 12 is reflected by the dual reflector 14, as illustrated by the lines of incidence shown in FIG. 1, in two opposing directions, and is then directed through an angle of approximately 90 degrees (or any other desired angle) by each of two flat reflectors or fold mirrors 24 and 24a, respectively. Then, each focussed beam of light impinges on a lens end 26, 26a of a circular light pipe 28, 28a. Each of the two circular light pipes 28, 28a is comprised of a transparent material, such as glass or clear plastic, and is adapted to integrate the light beam by means of multiple reflections within the light pipe.

On the right side of the system, or right channel 30, as illustrated, the light beam emerges from the light pipe 28 at an exit lens face 32. The diverging beam from the light pipe 28 is then collimated by means of a collimating lens 34. Following this, the collimated beam is split into a number of separate focussed beams by means of a multi-sector lens 36

4

Figure 4:
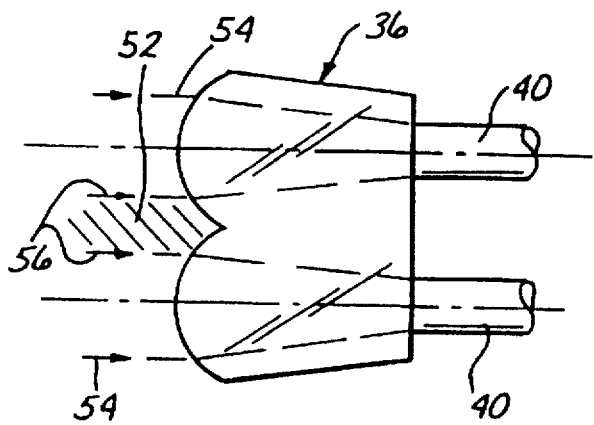
FIG. 4 is schematic side view illustrating the multi-sector lens which forms a part of the optical system shown in FIG. 1.
Figure 5:
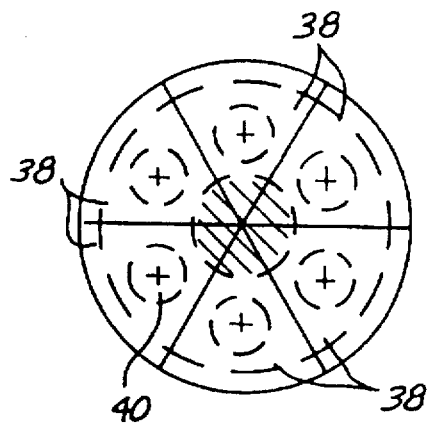
FIG. 5 is an end view of the multi-sector lens shown in FIG. 4.

(FIGS. 1, 4, and 5). Each of the lens sectors 38 (FIG. 5) focusses onto the core of a corresponding output fiber 40.

The optical system for the left beam focussed by the dual reflector 14 through the left channel 42 can be essentially the same as that described with respect to the right channel 30, or some different features may be incorporated into the left channel. For example, the right channel 30 might have a focussing lens and sector lens accommodating ten output fibers while the left channel might only couple to a single large fiber or multi-fiber bundle 44.

A useful feature of the invention, as illustrated in FIG. 1, is to incorporate at least two rotating color wheels (or light filter wheels) 46 and 46a at the entrance of the light pipe 28. With the color wheels 46 at the light pipe entrance, the color of the light to all of the fibers is the same and changes simultaneously as the wheels rotate.

Figure 2:
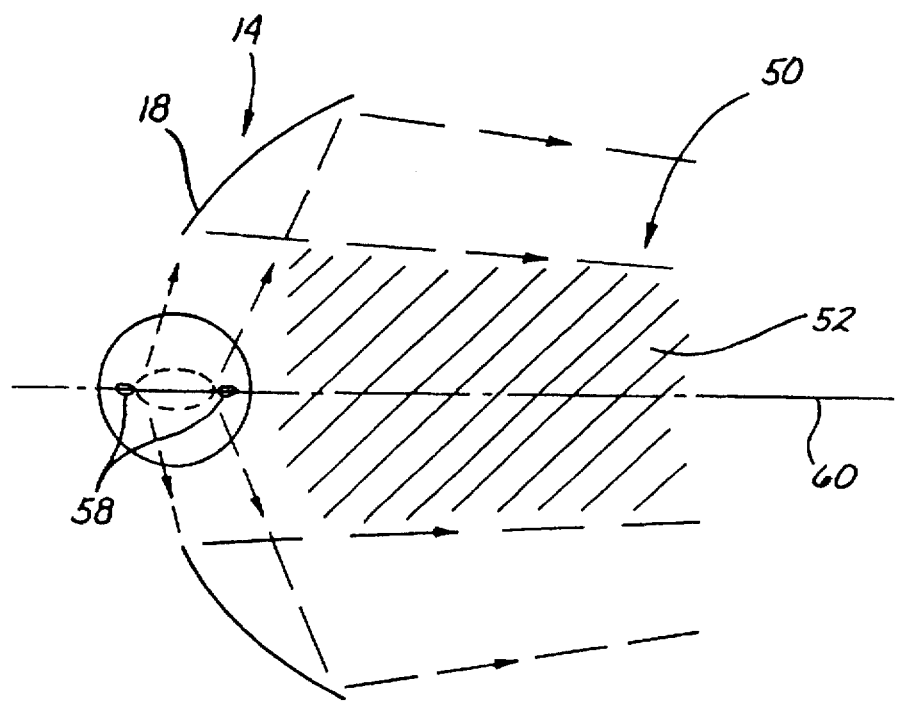
FIG. 2 is an enlarged schematic view of the lamp and right portion of the dual reflector illustrated in FIG. 1.
Figure 3:
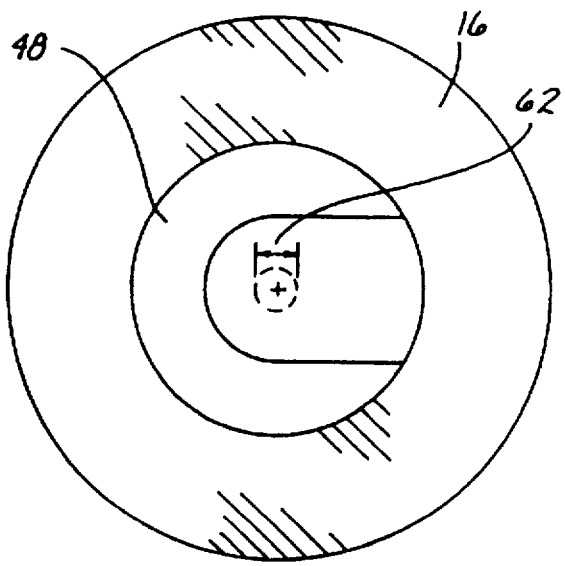
FIG. 3 is an end view of the dual reflector, taken along lines 3—3 in FIG. 1.

The high efficiency of this illumination system derives from the special design of a number of its elements working singly and in combination. The reflector 14 consists of two axially symmetrical curved halves or portions 16 and 18, with the lamp centered at their matching plane. This arrangement makes use of the very efficient collection properties of the low magnification section of the ellipsoidal (or near ellipsoidal) reflector shape. The large hole 48 in the center of each reflector-half (FIG. 3) results in a focussed light beam with a ring-shaped cross section. The light entering the hole in the reflector is not lost but passes into the opposite reflector-half and is focussed into the second focussed beam. This reflector arrangement efficiently generates a ring cross-section beam which is very useful in reducing the radial aperture required of each of the sector lenses 38. FIG. 2 shows a section through the right portion 18 of the dual reflector 14 indicating how the ring-shaped beam 50 is generated. The ring-shaped beam 50, wherein the darkened center portion 52 is represented by crosshatching, is preserved through the light pipe 28 and through the focussing lens 34 (see FIG. 1). As shown best in FIG. 4, the ring-shaped beam impinges on the sector lens as well, and it can be seen that the outer boundary 54 of the beam 50 and the inner boundary 56 thereof, define the lens aperture in the radial direction. The ring beam thus very usefully limits the required lens aperture and permits lenses of relatively short focal length to be used. This ability to use short focal length lenses permits much more efficient coupling into small diameter fibers, thus unexpectedly increasing the efficiency of the system. The minimum fiber diameter is controlled by the need to match the output beam divergence to the numerical aperture of the fiber.

Another important feature of the invention is the orientation of the light source 12. As illustrated particularly in FIG. 2, the light source 12 is shown at the focal point of the dual reflector 14. The long dimension of the arc discharge of the light source 12, as defined by the position of the electrodes 58, is oriented so as to be substantially parallel and coincident with the reflector symmetry axis 60. The efficiency of transmission of the optical system is greatly influenced by the arc orientation with respect to the reflector because of the high length to diameter ratio (typically about 5×) of the arc. By aligning the light source 12 as described, the small dimension 62 of the arc (FIG. 3) becomes the controlling parameter in defining the minimum permissible output fiber diameter for efficient coupling. Small output fiber diameter is usually desired in most applications. Designing for minimum output fiber diameter permits larger fibers to also be coupled efficiently, provided that the criterion of matching output beam divergence to fiber numerical aperture is met.

Although six equal lens sectors 38 are illustrated in FIG. 5, the sector lens 36 can have as few as two and up to twelve or more sectors. Also, the sectors need not be equal in area, since in some applications it may be desirable to deliver different amounts of light to different locations. The sector lens as a means of splitting the incident beam has a major advantage over currently used bundled fibers in that the sector lens array separates the fibers from each other (FIGS. 4 and 5), thereby permitting easy installation and removal of individual fibers.

The fold reflector 24, 24a may serve a multiple function of folding mirror and heat rejecting mirror. As a folding mirror, it also provides the ability of rotating the entire output optical system around a mechanical axis 64, as best shown in FIG. 1. This feature is very useful in allowing great flexibility in positioning the direction in which the fibers emerge from the unit. Independent rotation of the fold mirrors 24, 24a on either side of the light source 12 gives additional flexibility of output fiber location.

As described above, the circular light pipe 28 (as well as light pipe 28a) is used to integrate the angular distribution of the light around the pipe axis 66. This is advantageous since it allows the light output of each fiber to be identical (which is usually desired), because the angular light distribution from the light source 12 is not generally uniform. Additionally, the light source 12 will often have some color differences in the angular distribution which also needs to be integrated out in order to avoid undesirable color differences in output between fibers. Field lenses 26 and 32 (FIG. 1) are preferably employed on the light pipe ends to constrain the light inside the pipe so that it is totally reflected internally. Mechanically, the field lens portions 26 and 32 of the light pipe are larger in diameter than the pipe section itself in order to provide a loss-free means of mounting the light pipe. Anything touching the light pipe surface will bleed off some of the internally reflected light unless the pipe is clad, which is a disadvantageous approach since it reduces its numerical aperture and increases its cost.

The focussing lens 34 accomplishes the initial focussing of the light beam onto the output fibers 40. Thus, the focussing lens in conjunction with each individual lens sector 38 comprises a relay lens system that roughly images the output end of the light pipe onto the fiber port. The lens sectors may have aspheric shapes to reduce aberrations and improve efficiency, and are preferably given a thickness such that the output beam is focussed on the rear surface of the lens sector. This allows the soft core of the usual type of fiber to "wet" the lens surface, thereby reducing reflection losses at this interface.

Figure 8:
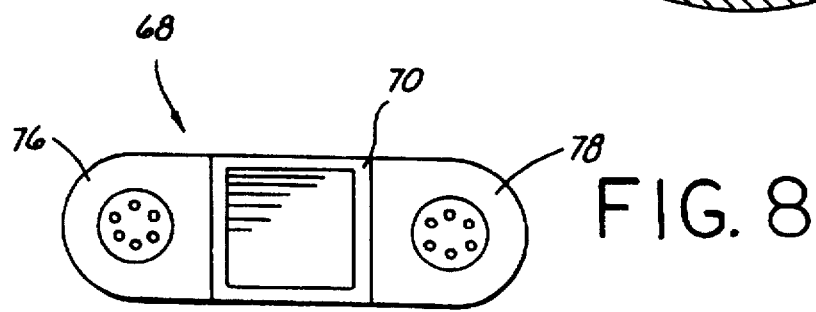
FIG. 8 is a schematic front view of the unit illustrated in FIGS. 6 and 7.
Figure 6:
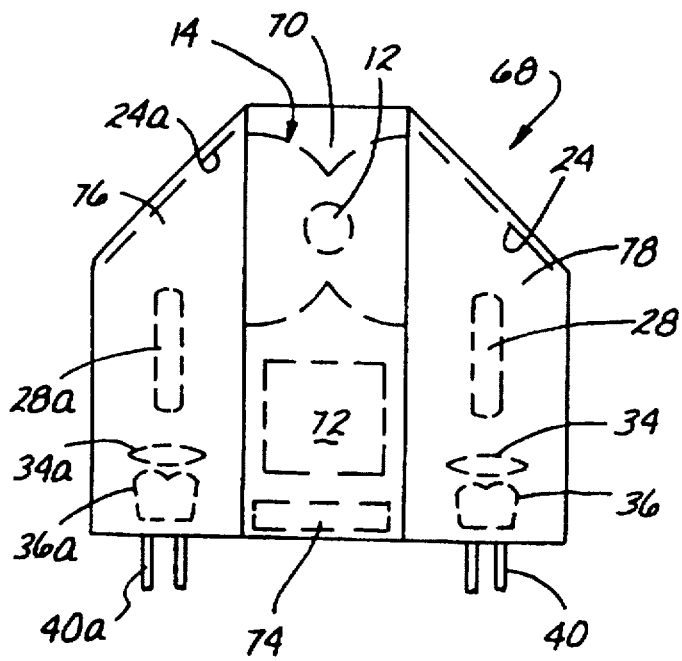
FIG. 6 is a schematic top view of an inventive fiber illumination unit, illustrating a housing containing the system elements shown in FIG. 1.
Figure 7:
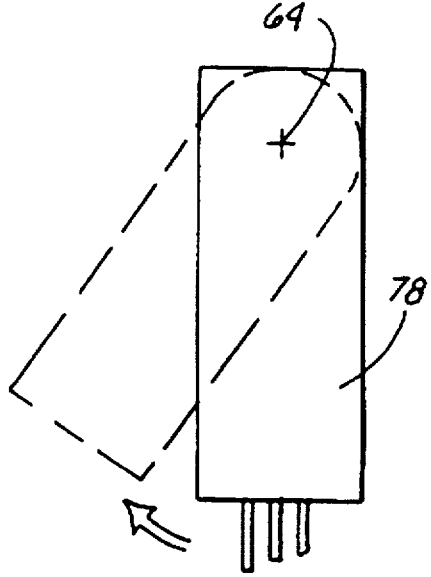
FIG. 7 is a schematic side view of the unit illustrated in FIG. 6.

A complete fiber illumination unit 68 having a modular dual-port construction, is illustrated schematically in FIGS. 6 through 8. The center module 70 of the unit contains the light source 12 and its dual reflector 14, together with a power supply 72, cooling fan 74, and all other associated electrical wiring, etc. Two side modules 76 and 78 preferably contain the fold mirrors 24 and 24a, the light pipes 28 and 28a, and the collimating lens 34 and 34a and sector lens assemblies 36 and 36a that feed into the fibers 40 and 40a. As discussed in connection with FIG. 1, although the two modules 76 and 78 are substantially identical, there is no requirement that they be so. Having different sector lenses on either side allows coupling to a different number of fibers on the two sides. Advantageously, the side modules 76 and 78 do not contain any electrical wiring and therefore can be detached easily from the center source module 70, using ordinary mechanical fasteners. The side modules can be rotated about the mechanical axis 64, as discussed in FIG. 1 and shown in FIG. 7, in order to allow convenient placement of the fiber output ports. This feature permits great flexibility for lighting installations with tight space restraints, in building utility closets and the like.

Figure 9A:
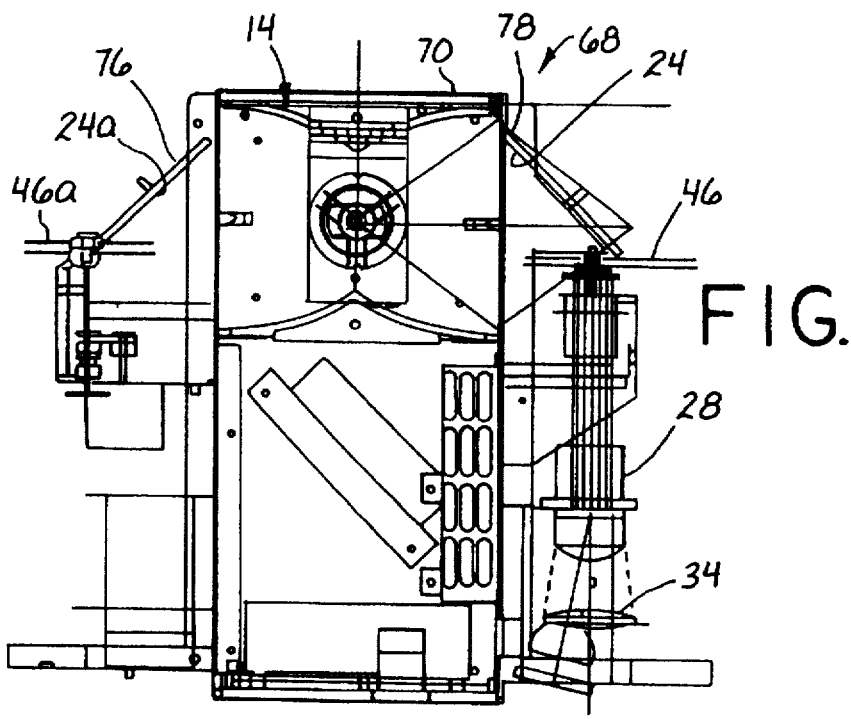
FIGS. 9a–9d are various views of the fiber illumination unit, according to the presently preferred embodiment.
Figure 9C:
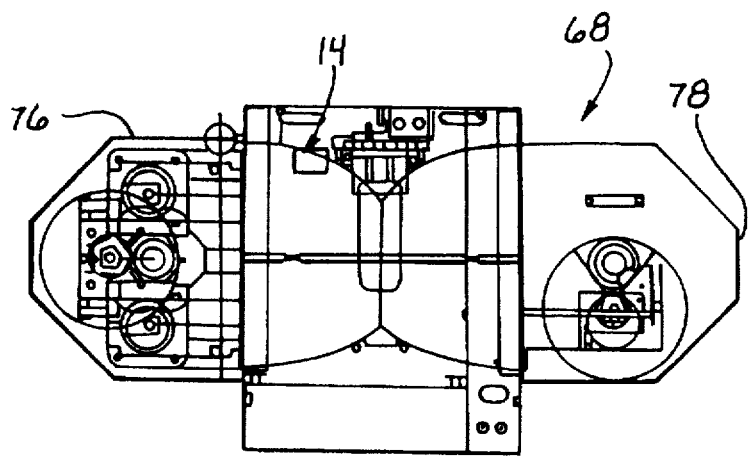
Figure 9D:
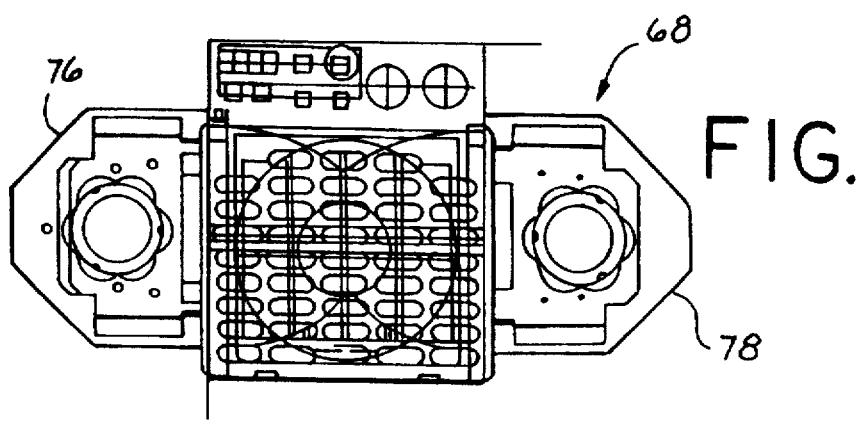
Figure 9B:
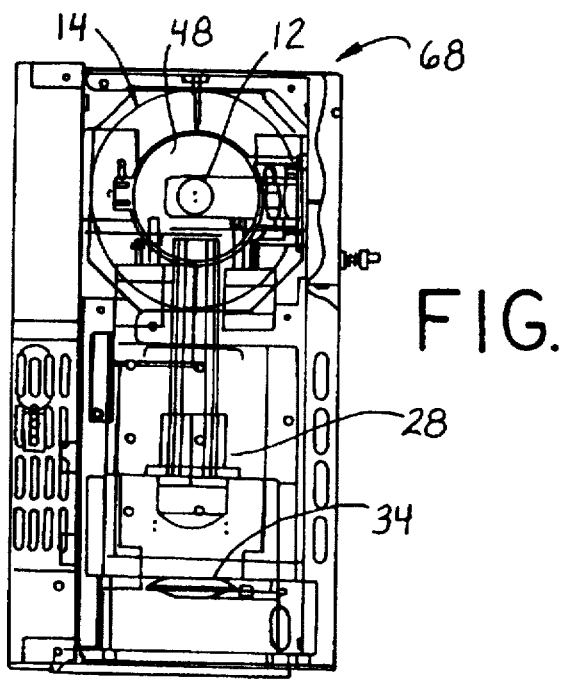

FIG. 9a illustrates a top-planar view of the fiber illumination unit 68 according to the presently preferred embodiment. As presently embodied, two color wheels 46, 46a are disposed between the fold mirror 24 and the light pipe 28, and two color wheels 46, 46a are disposed between the fold mirror 24a and a second light pipe (not shown). FIG. 9b illustrates a side view of the fiber illumination unit 68, and FIGS. 9c and 9d illustrate end views of the fiber illumination unit 68.

Figure 10C:
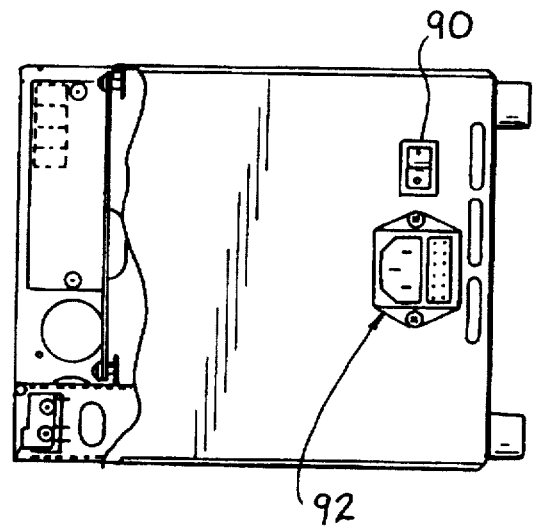
FIGS. 10a–10e are various views of the center source module, according to the presently preferred embodiment.
Figure 10A:
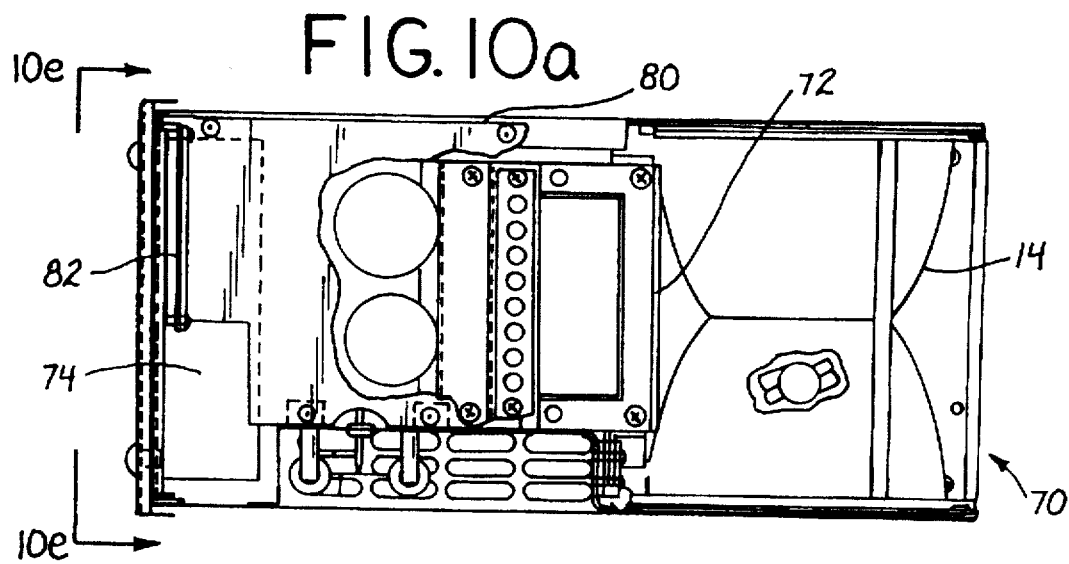
Figure 10B:
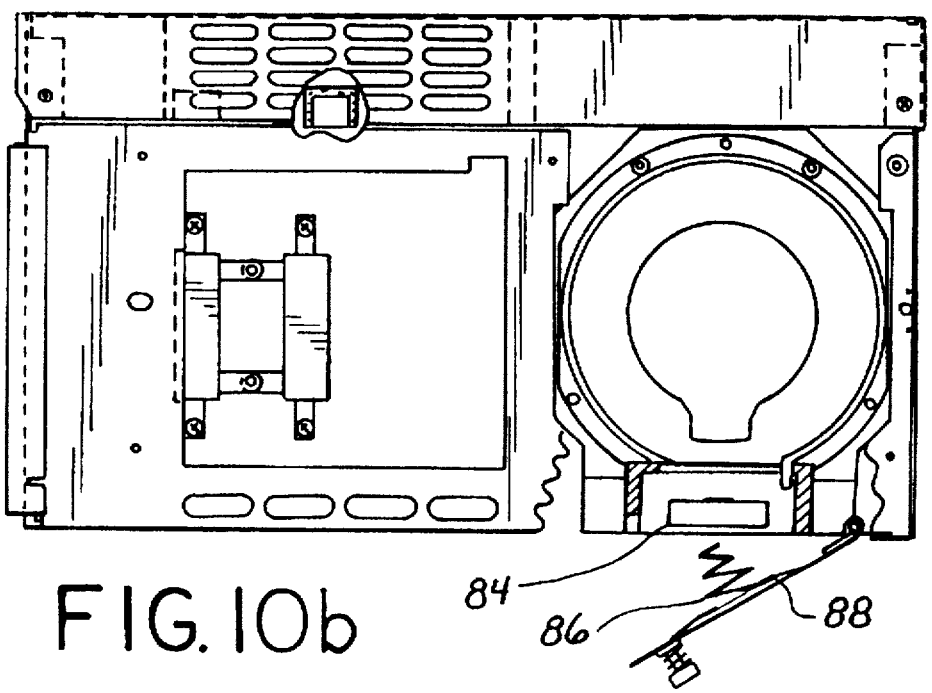
Figure 10D:
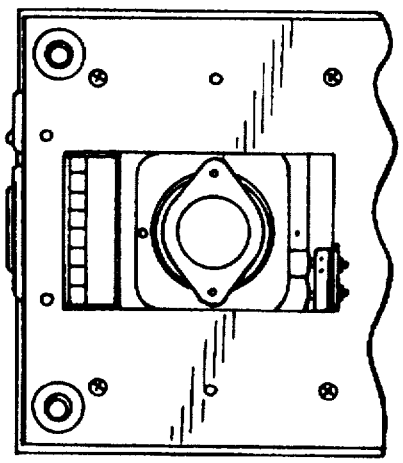
Figure 10E:
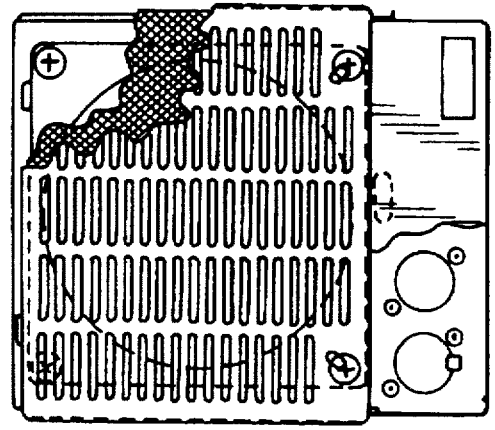

Turning to FIG. 10a, a top-planar view of the center source module 70 illustrates the power supply module 72, the cooling fan 74, a PCA DMX board 80, and a PCA display 82. A side view of the center source module 70 illustrates a harness lamp socket 84, a compression spring 86, and a hinged door 88. The end views shown in FIGS. 10c and 10d illustrate an on/off switch 90 and an AC electrical outlet 92. FIG. 10e illustrates a side view of the center source module 70, taken along line 10e—10e of FIG. 10a, and FIG. 11 illustrates an electrical schematic representation of the center source module 70.

Figure 12A:
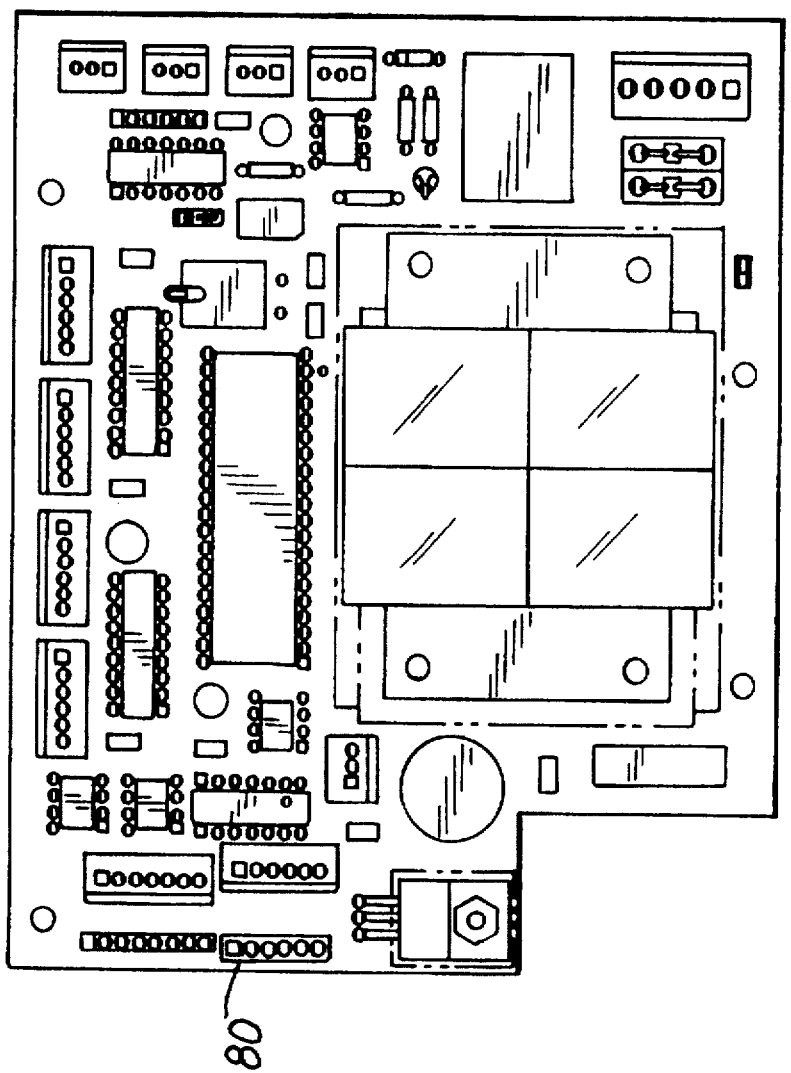
FIGS. 12a–12d illustrate various views of the PCA, DMX control system, according to the presently preferred embodiment.
Figure 12C:
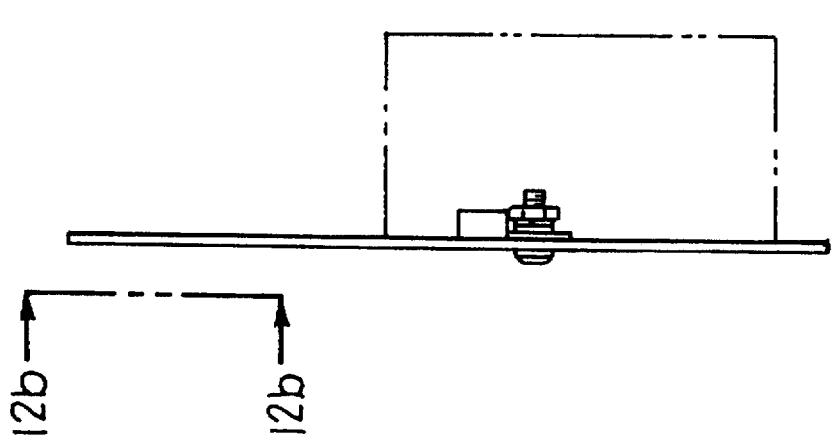
Figure 12D:
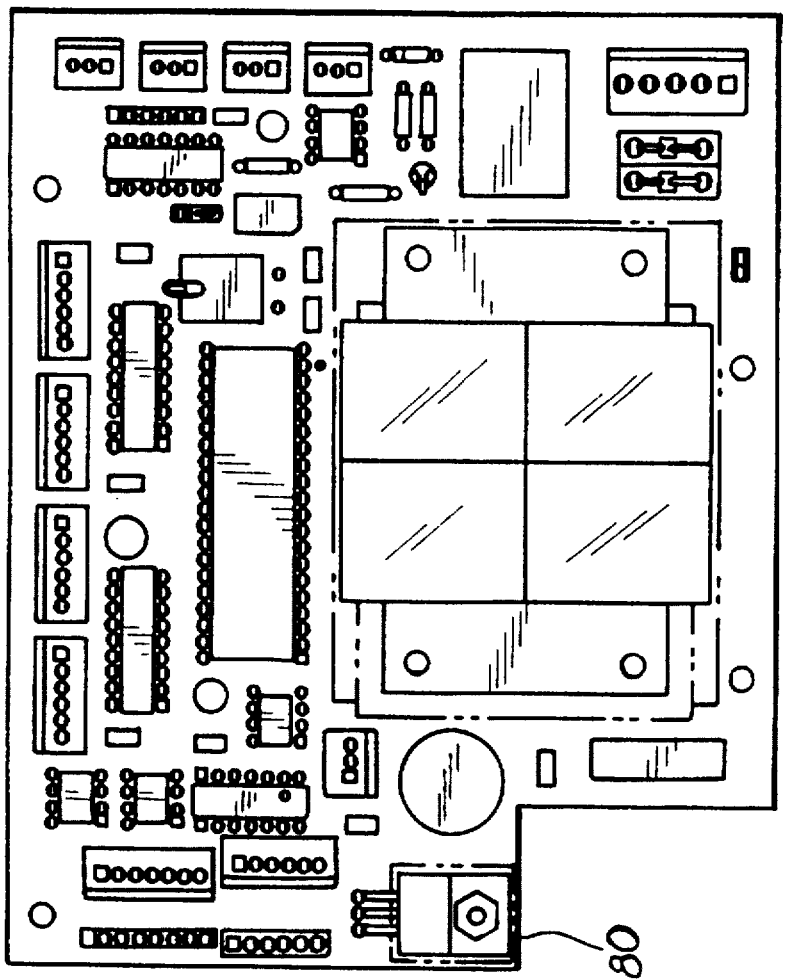
Figure 12B:
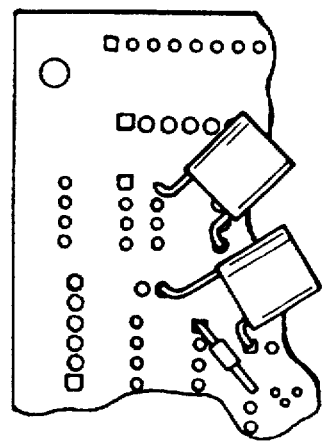
Figure 14A:
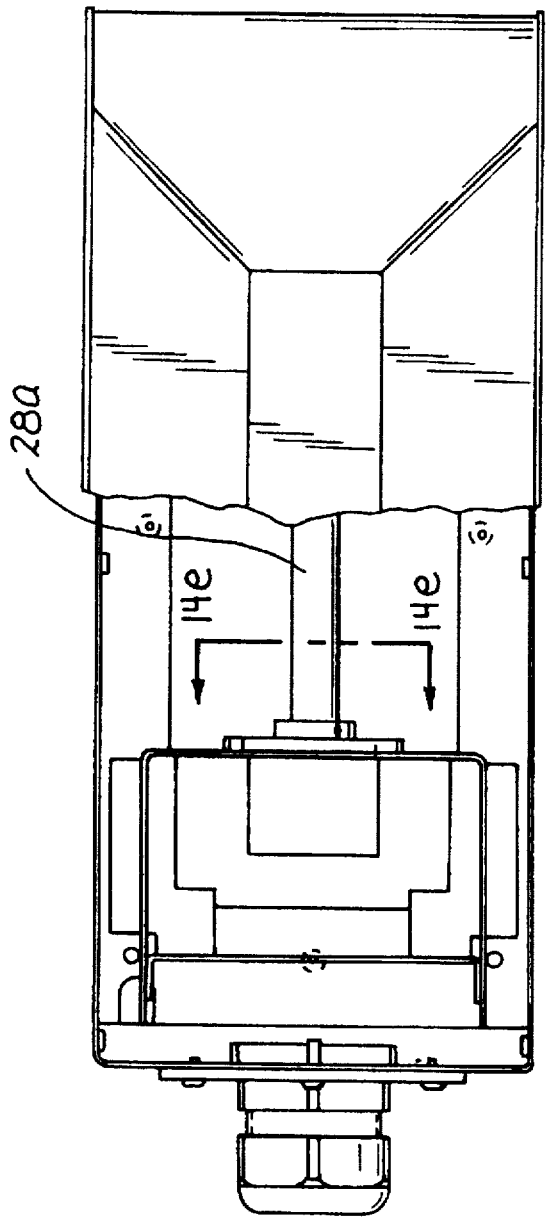
Figure 14E:
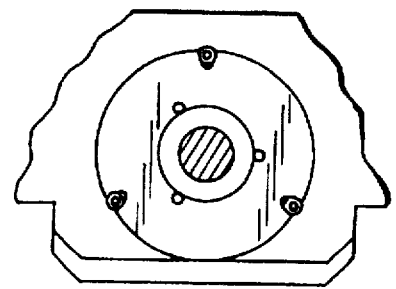
Figure 14C:
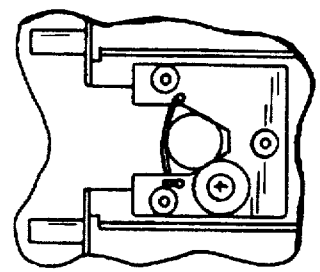
Figure 14B:
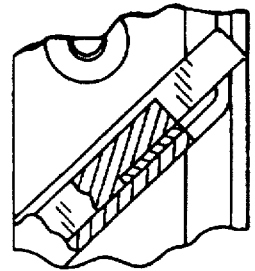

FIGS. 12a–12d illustrate detailed views of the PCA DMX board of FIGS. 10a and 11. The embodiment of FIGS. 12-12c illustrates a PCA DMX board having jumpers to operate from 120 volts AC input power, and the PCA DMX board embodiment of FIG. 12d has jumpers which are set to operate from 240 volts AC input power. The PCA DMX board is presently embodied to provide the following functions. The board provides a platform for storing software, transmits various pulses to various motors per software and user input, and provides DC power for the various motors. The PCA DMX board 80 further provides feedback sensing for motor home positions, and provides a capability for switching the light source 12 on and off from a membrane switch. Color cues for the color wheels 46, 46a can be stored in the PCA DMX board 80, and the PCA DMX board 80 can facilitate manual changing of the colors, as well. Additionally, the PCA DMX board can allow one unit (master) to provide DMX signals in order to drive other units (slaves) in unison with the master unit.

FIG. 13 is a detailed illustration of the side module 76 shown in FIG. 4. A heat shield 94a is disposed between the fold mirror 24a and a back wall 96a of the side module 76. FIGS. 14a–14f illustrate various interior views of the side module 76 components of FIG.13.

FIGS. 15a–15i illustrate various views of the color wheels 46, 46a, which are adapted for use in either the first side module 76, the second side module 78, or both. As presently embodied, the use of the first color wheel 46 and the second color wheel 46a provides a number of special functions. The two color wheels 46, 46a are preferably used together to allow for a total of ten cells for placement of color filters. Accordingly, more colors are available with use of both of the color wheels 46, 46a. The two color wheels 46, 46a overlap in front of the light pipe 28a, for example. One of the color filters is preferably an aluminum piece, which does not allow light therethrough. This filter can be adjusted over the light beam to provide dimming. The two color wheels 46, 46a together allow for mixing of colors.

Figure 15D:
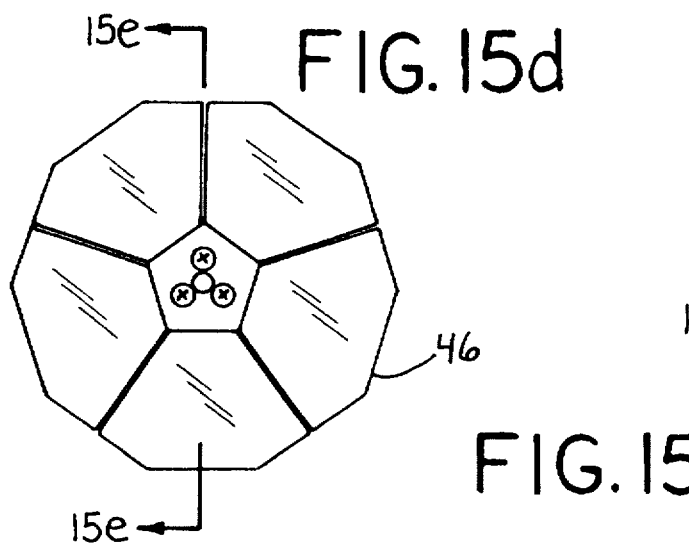
Figure 15E:
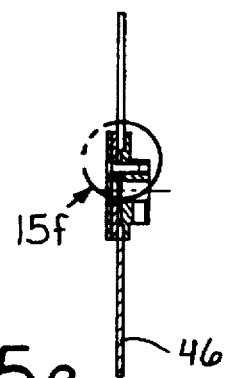
Figure 15F:
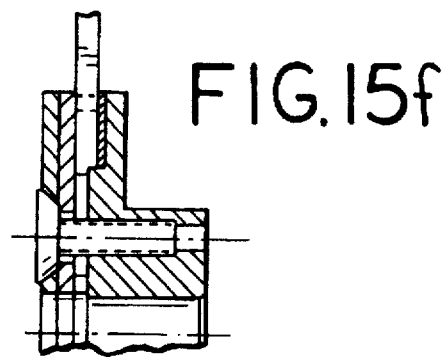
Figure 15G:
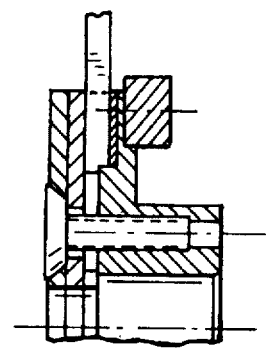
Figure 15H:
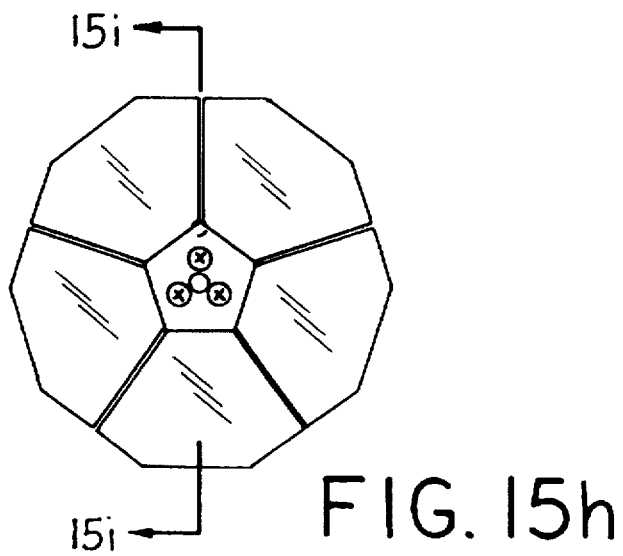
Figure 15I:
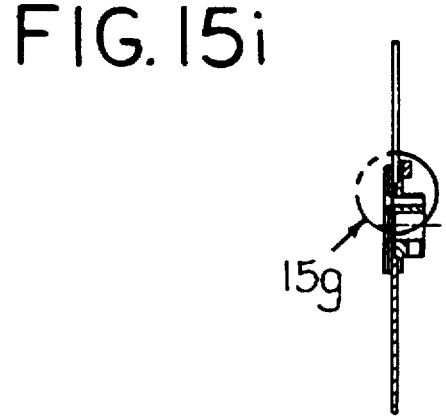
Figure 17A:
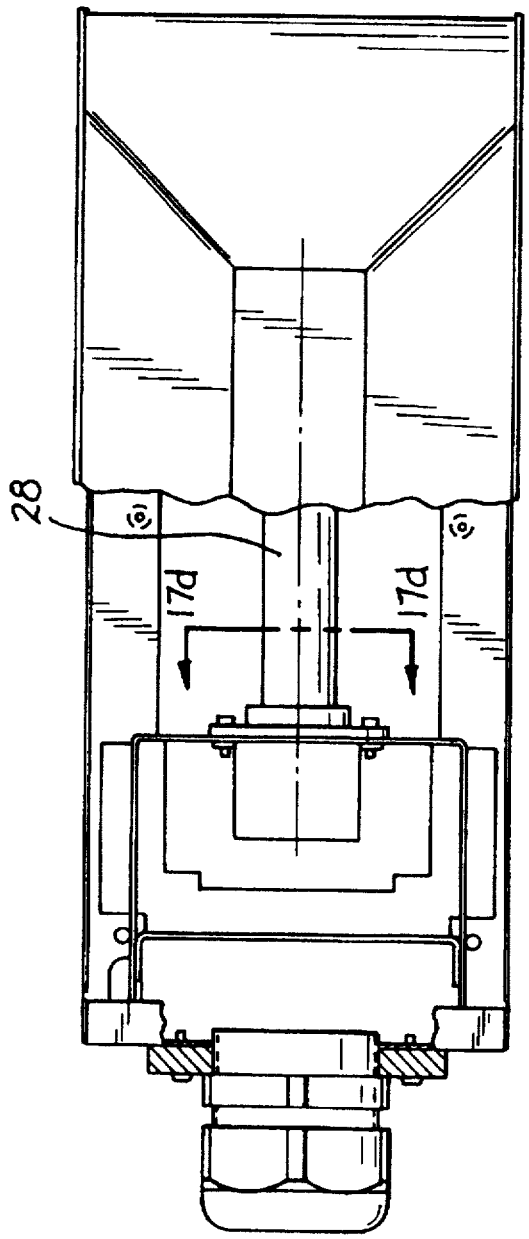
Figure 17E:
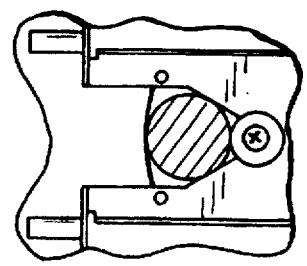
Figure 17D:
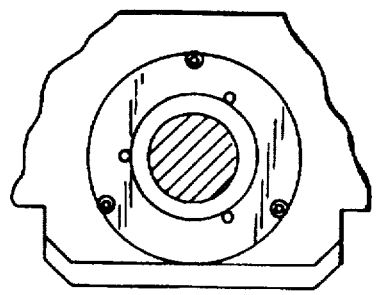
Figure 17B:
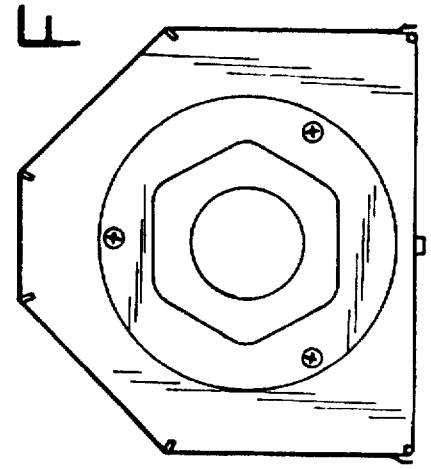

The first color wheel 46 is illustrated in FIGS. 15d–15f. This first color wheel 46 preferably comprises a one-eighth inch bore diameter. The second color wheel 46a is illustrated in FIGS. 15g–15i. This second color wheel 46a preferably comprises a one-fourth inch bore diameter. The two color wheels 46, 46a are configured with different sized bores to thereby facilitate concentric shaft operation. As presently embodied, the one-eighth inch bore diameter shaft of the first color wheel 46 is placed within the one-fourth inch bore diameter shaft of the second color wheel 46a. The motor assembly incorporates various shafts, pulleys and belts to thereby facilitate placement of the first and second color wheels 46, 46a within the optical assembly.

Figure 20A:
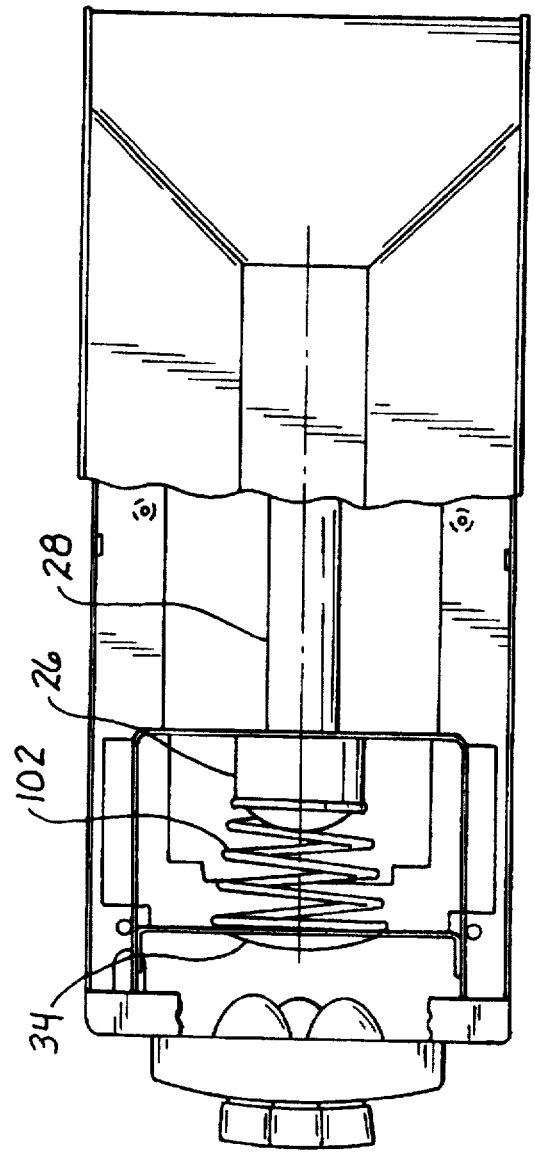
Figure 20D:
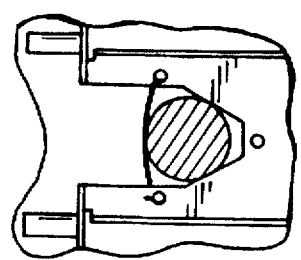
Figure 20C:
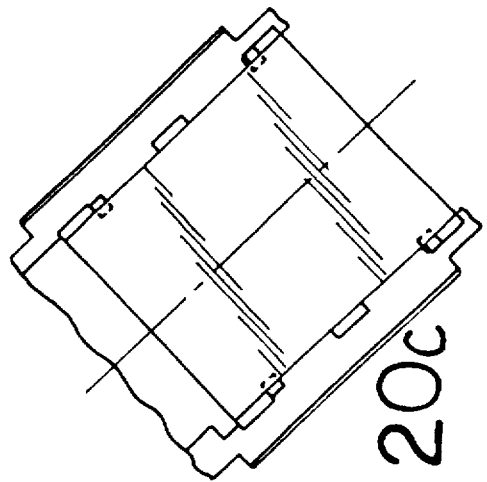
Figure 20B:
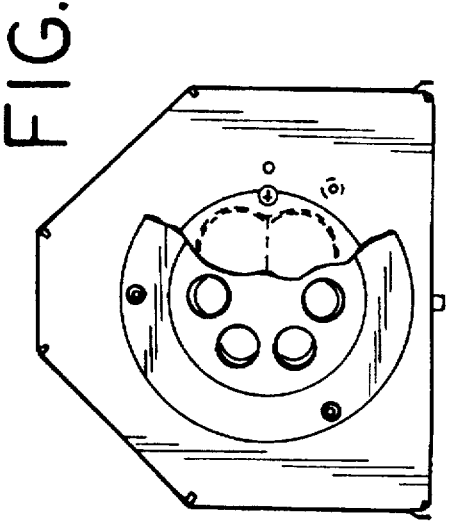
Figure 25A:
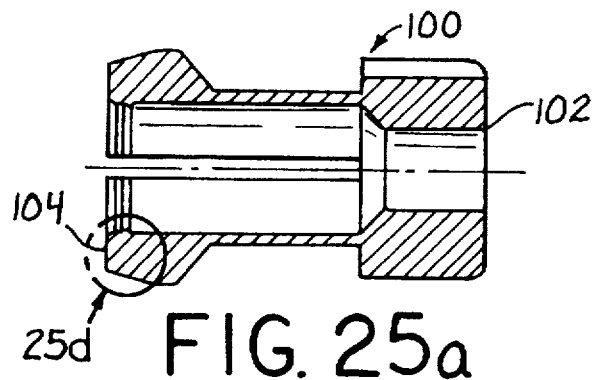
Figure 25B:
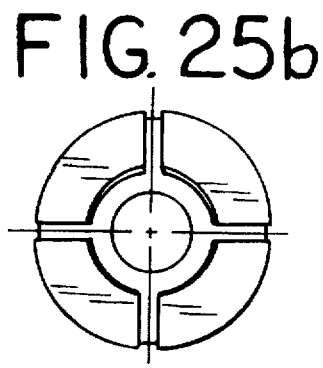

FIGS. 16a and 16b illustrate two views of a first configuration of the second side module 78 of FIG. 4. A heat shield 94 is placed between the fold mirror 24 and the back wall 96. FIGS. 17a–17e illustrate various views of the first configuration of the second side module 78 of FIGS. 16a and 16b. Additionally, FIGS. 18a and 18b illustrate a eight-tenths inch diameter light pipe and a one inch diameter light pipe, respectively. FIGS. 19a and 19b illustrate views of a second configuration of the second side module 78. The side module 78 shown in FIGS. 19a and 19b has a left-hand side cover removed, to thereby expose a ferrule housing assembly 98, which is adapted for housing ferrules 100 (FIG. 25a). FIGS. 20a–20d illustrate various views of the assembly shown in FIGS. 19a and 19b. A spring 102 is positioned between the focussing lens 34 and the field lens 26. The spring 102 pushes against the focussing lens 34 and the field lens 26. These lenses 26 and 34 have grooves cut into them so they can interface with the spring 102 and fit into a round cutout in the sheet metal. By pressing on the lenses as shown in FIG. 20a, for example, the lenses 26 and 34 are retained in the metal base without any screws or adhesive.

Figure 23B:
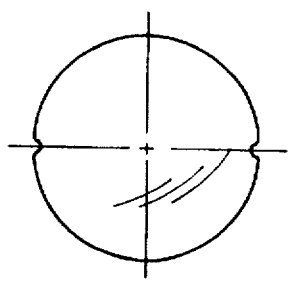
Figure 23A:
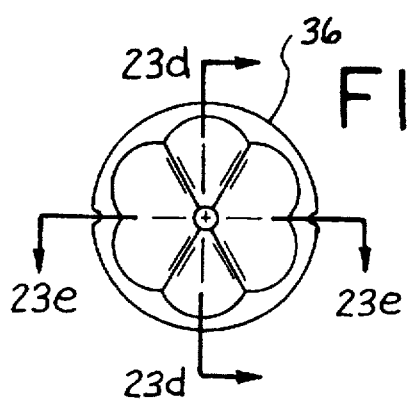
Figure 23C:
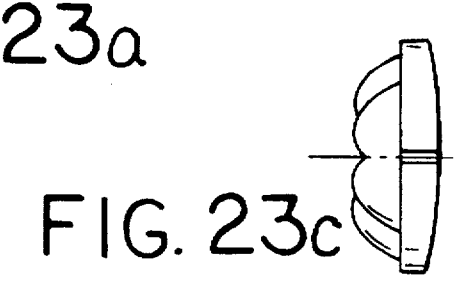

FIGS. 21a and 21b illustrate the field lens 26 and the light pipe 28, and FIGS. 22a and 22b illustrate various views of the focussing lens 34. FIGS. 23a–23e illustrate various views of the multi-sector lens 36. As presently preferred, the multi-sector lens 36 comprises six segments. Each segment of the multi-sector lens 36 is adapted for passing light into a corresponding optical fiber or light pipe. FIG. 23a is a front-elevational view of the multi-sector lens 36; FIG. 23b is a rear view of the multi-sector lens 36; and FIG. 23c is a side-elevational view of the multi-sector lens 36. FIGS. 23d and 23e are cross-sectional views of the multi-sector lens 36. The multi-sector lens 36 is adapted for being secured to the input end of the ferrule housing assembly 98.

Figure 25C:
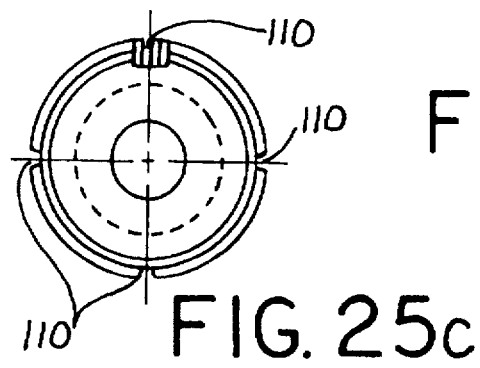
Figure 25D:
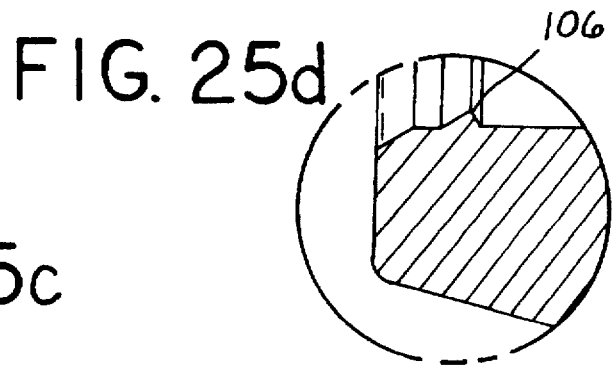
Figure 26A:
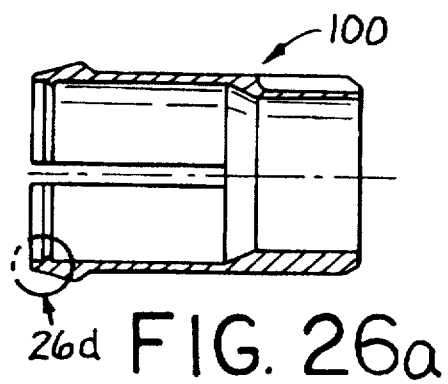
Figure 26B:
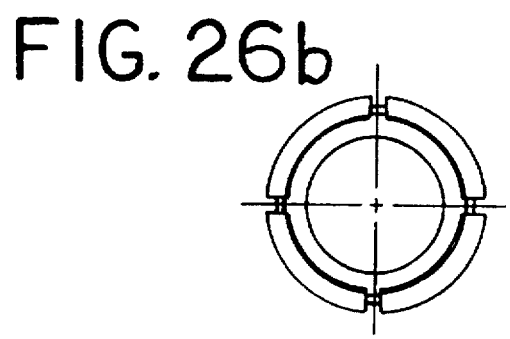
Figure 26C:
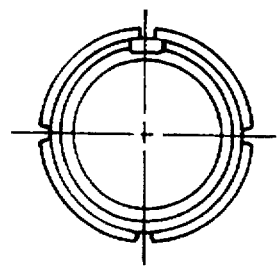
Figure 26D:
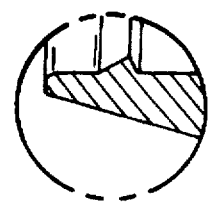

FIGS. 24a–24e illustrate various views of the ferrule housing assembly 98, which is used in the second configuration of the second side module 78, as shown in FIGS. 19a and 19b, for example. The six apertures in the ferrule housing assembly 98 are adapted for accommodating six corresponding ferrules 100 (FIG. 25a). Each ferrule may be configured to correspond to a first configuration, illustrated in FIGS. 25a–25d or a second configuration illustrated in FIGS. 26a–26d. The ferrule 100 in FIGS. 25a–25d generally comprises a small diameter guide end 102 and a larger diameter output end 104. As shown in FIG. 25d, for example, the interior surface of the output end 104 comprises tiny protrusions 106, which are adapted for digging into the jacket of the light guide to thereby securely hold the light guide. The tiny protrusions 106 dig into the jacket of the light guide, when a nut is secured around the outer diameter of the output end 104 of the ferrule 100. Four gaps 110, as illustrated in FIG. 25c, for example, allow the diameter of the output end 104 of the ferrule 100 to decrease, when the nut is tightened around the output end 104 of the ferrule 100. FIGS. 26a–26d illustrate a ferrule 102, which is configured almost identically to the ferrule 100. The ferrule 102 of FIGS. 26a–26d, however, has slightly larger diameters.

Although exemplary embodiments of the invention have been shown and described, many changes, modifications, and substitutions may be made by one having ordinary skill in the art without necessarily departing from the spirit and scope of this invention.

What is claimed is:

1. An optical fiber illumination system comprising a fiber illumination unit having a center module and at least one side module, wherein the center module contains a light source and a dual reflector and the at least one side module contains a light pipe, at least one light filter, a multi-sector lens, and at least one output fiber, said at least one side module being removably attachable to said center module.

2. The optical fiber illumination system as recited in claim 1, wherein said at least one side module contains no electrical wiring, and wherein the side module is rotatable with respect to the center module.

3. The optical fiber illumination system as recited in claim 1, wherein there are two side modules containing substantially identical optical system components.

4. The optical fiber illumination system as recited in claim 1, wherein there are two side modules containing substantially different optical system components.

5. An optical fiber illumination system comprising a fiber illumination unit having a center module and at least one side module, wherein the center module comprises a housing which contains a light source, and the at least one side module comprises a housing which contains at least two color wheels and other optical components for processing light emitted from said light source and directing said light to an input end of at least one optical fiber, said side module being removably attachable to said center module.

6. The optical fiber illumination system as recited in claim 5, wherein the light emitted from said light source is incoherent visible light, and wherein said at least one side module contains no electrical wiring, and is therefore readily detachable from said center module.

7. The optical fiber illumination system as recited in claim 5, wherein the side module is rotatable with respect to the center module.

8. The optical fiber illumination system as recited in claim 5, wherein there are two side modules containing substantially identical optical system components.

9. The optical fiber illumination system as recited in claim 5, wherein there are two side modules containing substantially different optical system components.

10. The optical fiber illumination system as recited in claim 5, wherein the optical components in the at least one side module comprise a multi-sector lens, the number of output optical fibers being equal in number to the number of sectors in said lens, and each of said lens sectors being arranged to direct light from said light source to an input end of a corresponding one of said output optical fibers.

11. The optical fiber illumination system as recited in claim 10, wherein said optical components further comprise:

a light pipe disposed between said light source and said multi-sector lens; and a collimating lens disposed between said light pipe and said multi-sector lens.

12. The optical fiber illumination system as recited in claim 10, wherein the optical components further comprise a fold mirror disposed at an end of said side module proximal to said light source, for redirecting the light emitted from said light source toward said multi-sector lens.

13. The optical fiber illumination system as recited in claim 5, wherein the optical components in said at least one side module comprise a light pipe which is adapted to transmit light directly to an input end of a single output optical fiber.

14. The optical fiber illumination system as recited in claim 5, wherein the center module further includes a dual reflector having an axis of symmetry and the light source is a lamp of the arc discharge type, the long dimension of the arc discharge of the lamp being oriented so as to be substantially parallel and coincident with the reflector symmetry axis.

15. The optical fibre illumination system as recited in claim 5, wherein the center module further comprises a cooling fan and a power supply, and wherein the lens sectors of said multi-sector lens are aspheric.

16. The optical fiber illumination system as recited in claim 10, wherein said at least two color wheels are disposed between said dual reflector and said light pipe.

17. An optical fiber illumination system, comprising:

a light source;

a dual reflector having an axis of symmetry;

a first channel having at least two color wheels, a light pipe and a multi-sector lens, a first end of the light pipe being arranged to receive light emitted from said at least two color wheels, and a second end of the light pipe being arranged to transmit light to said multi-sector lens; and a plurality of output optical fibers corresponding in number to the number of segments of said multi-sector lens, each of said output optical fibers having an input end and an output end, wherein each of said lens sectors are arranged to transmit light to the input end of a corresponding one of said output optical fibers.

18. The optical fiber illumination system as recited in claim 17, and further comprising a second channel having at least two color wheels, a light pipe, a first end of the light pipe being arranged to receive light emitted from said at least two color wheels, and a second end of the light pipe being arranged to transmit light to a single optical fiber.

19. The optical fiber illumination system as recited in claim 18, wherein the first channel further comprises a collimating lens disposed between the light pipe and the multi-sector lens.

20. The optical fiber illumination system as recited in claim 18, wherein each of the first and second channels comprises a fold mirror disposed between the light source and the light pipe, wherein the lens sectors of the multi-sector lens are aspheric, and wherein the sectors of the multi-sector lens are unequal in cross-sectional area.

21. The optical fiber illumination system as recited in claim 1, wherein said at least one light filter selectively blocks all light impinging thereon, thereby comprising a shutter.

22. The optical fiber illumination system as recited in claim 21, wherein said at least one light filter comprises an aluminum piece.

23. The optical fiber illumination system as recited in claim 1, wherein said at least one light filter comprises a color wheel.

24. The optical fiber illumination system as recited in claim 1, wherein said at least one light filter comprises at least two color wheels.

25. An optical fiber illumination system comprising:

a light source;

a reflector for reflecting light emitted from said light source;

a multi-sector lens for transmitting light from said reflector;

an output fiber for receiving light transmitted from said lens; and a light filter for blocking light transmitted through said system.

26. The optical fiber illumination system as recited in claim 25, wherein said light filter is disposed between said reflector and said multi-sector lens.

27. The optical fiber illumination system as recited in claim 25, wherein said light filter is disposed between said multi-sector lens and said output fiber.

28. The optical fiber illumination system as recited in claim 25, wherein said light filter is disposed on a wheel, so that said filter may be selectively rotated into the light path in said system.

29. The optical fiber illumination system as recited in claim 28, wherein said wheel comprises a color wheel.

30. The optical fiber illumination system as recited in claim 29, and further comprising a second color wheel.

* * * * *